(No Model.)
P. H. ADAMS, Jr., & O. T. X. ADAMS.
APPARATUS FOR USE IN DECOMPOSING METALLIC SALTS AND DESULPHURIZING ORES.
No. 416,314. Patented Dec. 3, 1889.
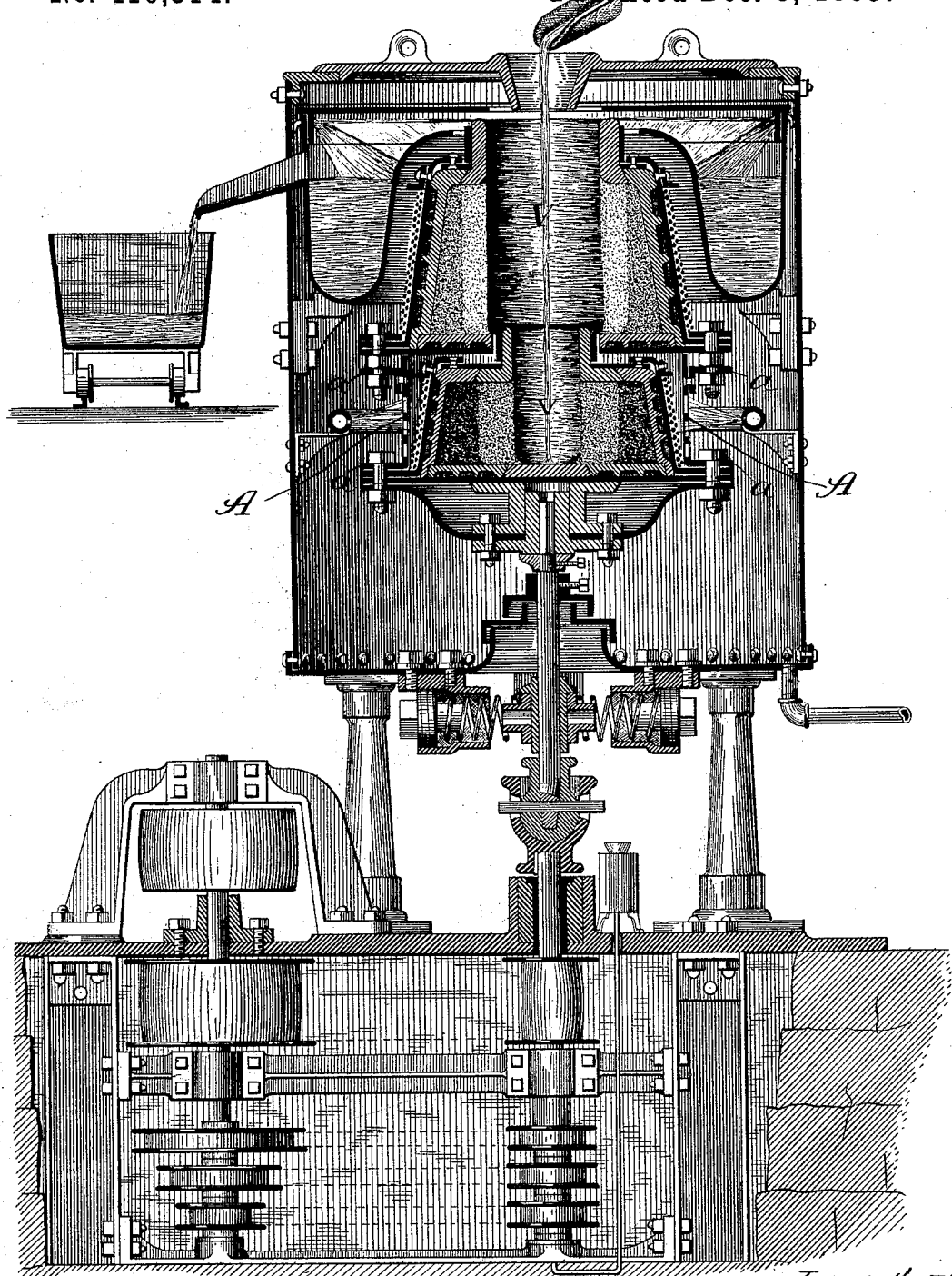

UNITED STATES PATENT OFFICE.

PHINEAS H. ADAMS, JR., AND ORSEMAS T. X. ADAMS, OF CHICAGO, ILLINOIS, ASSIGNORS TO MELINDA PECK, OF SAME PLACE.

APPARATUS FOR USE IN DECOMPOSING METALLIC SALTS AND DESULPHURIZING ORES.

SPECIFICATION forming part of Letters Patent No. 416,314, dated December 3, 1889.

Application filed March 9, 1889. Serial No. 302,666. (No model.)

*To all whom it may concern:*

Be it known that we, PHINEAS H. ADAMS, Jr., and ORSEMAS T. X. ADAMS, citizens of the United States, residing at Chicago, Illinois, have invented certain new and useful Improvements in Apparatus for Use in Decomposing Metallic Salts and Desulphurizing Ores, of which the following is a specification.

The object of our invention is to provide an apparatus for mechanically decomposing metallic salts and desulphurizing ores or their resulting material, when the substances treated are in a molten condition, by the action of centrifugal force, and dividing them into separate and distinct classes; and our invention consists in the features and details of construction hereinafter described and claimed.

In the drawing we have shown a vertical section of our improved apparatus, showing two receiving-vessels arranged in proper relation to each other, together with the supporting-shaft and running-gear, part of which is in elevation.

In making our improved apparatus for decomposing chemical compounds, metallic salts or salts of metals, and desulphuring ores we make a compound or multiplex receiving-vessel V, adapted to receive the substances to be treated when in a molten condition. This receiving-vessel may be made in such a way as will secure the required strength and reduce the conduction of heat from the interior to the exterior. It may be surrounded by a curbing, and in other respects so made as to subserve the end in view and permit of its being rotated at a high rate of speed for the separation of particles of different degrees of density or specific gravity in the matter treated into separate and distinct classes.

Many of the parts and the details of their construction, as they do not form the subject-matter of our present claims, need not be described in detail, as they will be sufficiently understood from an inspection of the drawing. The receiving-vessel, however, as above stated, is intended to be compound or multiplex—that is, composed of two or more receiving-vessels arranged in such relation to each other that the matter treated will pass through each vessel successively, depositing in each vessel the heaviest particles of the matter treated therein and discharging the lighter particles into the next adjacent vessel, where the heaviest particles remaining will be deposited and the lighter again discharged. In this way all of the matter treated is acted upon in the first vessel, in which it is subjected to the action of centrifugal force, the heavier particles separated, and the balance again acted upon in the next vessel into which it is thrown and treated by the action of centrifugal force. In this way the matter treated may be successively acted upon in a series of receiving-vessels and the particles separated into classes, according to their specific gravity.

The compound or multiplex receiving-vessel, thus consisting of two or more receiving-vessels, is intended to be mounted upon a revoluble actuating-shaft and rotated as it revolves; and in order that the different vessels composing the compound receiving-vessel may be rotated in unison and as one vessel the neck or mouth of one is inserted into a hole or opening in the end of its adjacent vessel and the vessels rigidly fastened together.

As shown in the drawing, we employ an annular perforated plate A, provided with flanges or ears $a$, by which it may be firmly and securely bolted to the extending flanges composing the bottom of the different receiving-vessels. By making this plate perforated a jet or stream of water may be employed, as shown in the drawing, to spray the receiving-vessel and prevent it from becoming overheated. Other means, however, may be employed for fastening the different receiving-vessels together, if preferred. By removing the bolts or fastenings the different vessels may be separated from each other, so that one may be lifted out and emptied without disturbing the contents of the other. By thus dividing the receiving-vessel into a number of vessels in which the matter treated is retained in different classes and separably attaching them together, that vessel which retains the heaviest particles, which usually comprise the smallest portion of the material treated, can be used while the vessel containing the lighter particles, which usually constitute the larger portion of the metal treated, is repeatedly filled and emptied.

As shown in the drawing, we have represented the compound or multiplex receiving-vessel as composed of two receiving vessels or receptacles in which the molten material is successively treated and have shown them arranged in a vertical position mounted upon a vertical revoluble actuating-shaft, which rotates them as it revolves. When thus arranged, the lower vessel is adapted and intended to retain the heaviest particles of the matter treated, while the one above it is adapted and intended to retain the particles of lighter specific gravity, permitting the articles of lightest specific gravity to be discharged by the action of centrifugal force from the neck or mouth of the receiving-vessel through which the material passes.

If, to illustrate the operation of our invention, material such as molten copper ores or mattes containing precious or other heavier metals—such as gold, lead, or silver—be introduced into our compound or multiplex receiving-vessel, and the same rotated at a high rate of speed, the gold, lead, or silver will be carried to the sides of the vessel in which the matter is first subjected to the action of centrifugal force, where they will accumulate and displace the copper and other lighter particles. As the first vessel fills, the displacement of the lighter particles will proceed until they reach the neck or mouth, when they will be thrown off by the action of centrifugal force into and against the walls of the next adjacent vessel. Here the copper particles, being the heaviest in the matter now being treated, will accumulate against the sides and displace the lighter particles. This displacement will again proceed until the lightest particles—such as slag, sulphur, and residues—have reached the neck or mouth of the vessel, when they will pass upward and be thrown off by the action of centrifugal force into another adjacent vessel or into the receptacle in which they are deposited for final disposition. We will thus have the heaviest particles, as the gold, lead, or silver, accumulated by themselves in the first vessel in which the matter is treated, and the lighter particles, as the copper, accumulated by themselves in the next adjacent vessel, and the lightest particles—such as slag and worthless residue—for the most part thrown off and discharged. This method of separating the particles of the matter treated into classes corresponding to their specific gravity may be carried to any extent desired by increasing the number of vessels employed in our compound or multiplex receiving-vessel, and therefore we do not propose to confine ourselves to the use of but two vessels, as shown in the drawing.

In our present application the distinguishing feature or principle which we particularly desire to secure is the separation of the particles of the material treated into different classes by the employment of a compound or multiplex revoluble receiving-vessel adapted to receive and treat the material successively in different vessels while in a molten condition, and to that end we arrange the vessels entering into our compound or multiplex receiving-vessel in such relation to each other that the material treated is carried from one vessel to the next adjacent vessel by the action of centrifugal force, where the centrifugal treatment is repeated. We do not, therefore, confine ourselves to mere details of construction.

What we regard as new, and desire to secure by Letters Patent, is—

1. In an apparatus for decomposing metallic salts or salts of metals and desulphurizing ores when in a molten state, the combination of a compound or multiplex revoluble receiving-vessel adapted to receive molten material to be treated, comprising two or more vessels in a series, with the neck or mouth of each vessel except the last extending to the next adjacent vessel and discharging the material treated into such vessel by the action of centrifugal force, whereby the material is successively treated in different vessels and a part deposited and retained in each, a revoluble actuating-shaft rotating said compound or multiplex vessel as it revolves, and means for revolving the actuating-shaft, substantially as described.

2. In an apparatus for decomposing metallic salts or salts of metals and desulphurizing ores when in a molten state, the combination of a compound or multiplex revoluble receiving-vessel adapted to receive molten material to be treated, comprising two or more vessels in a series, with the neck or mouth of each vessel except the last extending to the next adjacent vessel, and discharging the material treated into such vessel by the action of centrifugal force and with each of the vessels separably attached to and rotatable with the next adjacent vessel, a revoluble actuating-shaft rotating said compound or multiplex vessel as it revolves, and means for rotating the actuating-shaft, substantially as described.

PHINEAS H. ADAMS, Jr.
ORSEMAS T. X. ADAMS.

Witnesses:
SAMUEL E. HIBBEN,
GEORGE S. PAYSON.